(12) United States Patent
Han et al.

(10) Patent No.: US 8,817,752 B2
(45) Date of Patent: Aug. 26, 2014

(54) METHOD AND APPARATUS FOR DETERMINING MATCHING OF INTER-CELL RESELECTION PARAMETERS AND HANDOVER PARAMETERS

(75) Inventors: Lifeng Han, Shenzhen (CN); Feng He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 321 days.

(21) Appl. No.: 13/266,109

(22) PCT Filed: Apr. 22, 2010

(86) PCT No.: PCT/CN2010/072031
§ 371 (c)(1),
(2), (4) Date: Oct. 24, 2011

(87) PCT Pub. No.: WO2010/121553
PCT Pub. Date: Oct. 28, 2010

(65) Prior Publication Data
US 2012/0039305 A1 Feb. 16, 2012

(30) Foreign Application Priority Data
Apr. 22, 2009 (CN) .......................... 2009 1 0137448

(51) Int. Cl.
*H04W 4/00* (2009.01)
*H04W 36/24* (2009.01)
*H04W 24/02* (2009.01)
*H04W 92/20* (2009.01)

(52) U.S. Cl.
CPC ............ *H04W 36/245* (2013.01); *H04W 24/02* (2013.01); *H04W 92/20* (2013.01)
USPC .......................................... 370/332; 455/436

(58) Field of Classification Search
USPC ......... 370/252, 254, 255, 328, 331–334, 401; 455/436–444, 525, 552.1
See application file for complete search history.

(56) References Cited

U.S. PATENT DOCUMENTS

2002/0111166 A1  8/2002  Monroe
2009/0111473 A1  4/2009  Tao et al.
(Continued)

FOREIGN PATENT DOCUMENTS

CN   101365242 A    2/2009
JP   2008-278303    11/2008

OTHER PUBLICATIONS

T-Mobile. Information to be included at Hand Over request messages, to avoid Ping-Pong Hand Over [online]. In: 3GPP TSG-RAN WG3 Meeting #57. Aug. 2007 [retrieved on Jan. 23, 2012]. Retrieved from the Internet: <URL:http://www.3gpp.org/ftp.tsg_ran_WG3_Iu/TSGR3_57/Docs/R3-071598.zip>.

(Continued)

*Primary Examiner* — Yemane Mesfin
*Assistant Examiner* — Mon Cheri Davenport
(74) *Attorney, Agent, or Firm* — Knobbe, Martens, Olsen & Bear, LLP

(57) ABSTRACT

Methods and an apparatus for judging matching of inter-cell reselection parameters and handover parameters are disclosed. In some embodiments, a target base station counts the probability that cell handover of a terminal occurs subsequent to a radio resource control connection is established according to a handover request message or a relocation request message. The target base station judges whether the probability exceeds a threshold. If the probability exceeds a threshold, it is determined that the inter-cell reselection parameters and the handover parameters between a source base station and the target base station are not matched. Otherwise, it is determined that the inter-cell reselection parameters and the handover parameters are matched.

12 Claims, 4 Drawing Sheets

(56) References Cited

U.S. PATENT DOCUMENTS

2011/0026484 A1* 2/2011 Fox et al. ............... 370/331
2011/0117907 A1* 5/2011 Hooli et al. ............. 455/422.1

OTHER PUBLICATIONS

Huawei. Solutions for the Mobility Rubustness use case [online]. In: 3GPP TSG RAN WG3 Meeting #60. May 2008 [retrieved on Jan. 23, 2012]. Retrieved from the Internet: <URL: http://www.3gpp1.net/ftp/tsg_ran/WG3_Iu/TSGR3_60/Docs/R3-081165%20.zip> (Markup in Original).

International Search Report mailed Jul. 29, 2010, for International Application No. PCT/CN2010/072031.

Written Opinion of the International Searching Authority mailed Jul. 29, 2010, for International Application No. PCT/CN2010/072031.

International Preliminary Report on Patentability dated Oct. 25, 2011, for International Application No. PCT/CN2010/072031.

Chinese Examination Report dated Sep. 3, 2013 received in Chinese Application No. 2009/10137448.7 in 5 pages.

Japanese Examination Report in Japanese Application No. 2012-506323 issued on Aug. 27, 2013 in 2 pages.

* cited by examiner

METHOD AND APPARATUS FOR DETERMINING MATCHING OF INTER-CELL RESELECTION PARAMETERS AND HANDOVER PARAMETERS

CROSS-REFERENCE TO RELATED APPLICATIONS

This application is the U.S. National Phase application under 35 U.S.C. §371 of International Application PCT/CN2010/072031 filed Apr. 22, 2010, which claims priority to Chinese Application 200910137448.7 filed Apr. 22, 2009.

FIELD OF THE INVENTION

The present invention relates to the communication field, and in particular to a method and an apparatus for determining matching of inter-cell reselection parameters and handover parameters.

BACKGROUND OF THE INVENTION

A Long-Term Evolution (LTE) network comprises an Evolved Universal Mobile Telecommunication System Radio Access Network (E-UTRAN) NodeB (eNB) and an Evolved Packet Core (EPC), and is a flattening network. The E-UTRAN comprises a set of eNBs which are connected with the EPC through an S1 interface; and the eNBs are connected with each other through X2. The S1 and the X2 interface are logic interfaces. One EPC can manage one or more eNBs; and one eNB can be controlled by a plurality of EPCs and can manage one or more cells.

A Self-Organized Network (SON) is a technique which automatically carries out network configuration and optimization. The technique is characterized of self-configuration and self-optimization. With the application of the technique in the LTE, an LTE base station (eNB) can automatically configure network parameters according to certain measurement, and can perform automatic optimization according to network changes; therefore, performance of the network can be maintained to be optimal, and a large quantity of manpower and material resources is saved at the same time.

As for self-optimization of handoff parameters of an LTE system, parameters related to reselection and handover of a cell are optimized, according to operation situation of the network, relevant measurement, and certain algorithms, so as to improve the performance of the network. The handover here is a handover occurring in the LTE system and the handover occurring between systems. The handover between the systems indicates the handover to a Universal Mobile Telecommunication System Radio Access Network (UTRAN), a Global system for Mobile Communication (GSM) or a Code Division Multiple Access (CDMA). Similarly, cell reselection also comprises the cell reselection occurring in a system and between the systems. During the handover process, a handover request message will carry history information of a User Equipment (UE). The history information comprises cell identifier(s) (IDs) and cell type(s) of cell(s) in which the UE has stayed as well as stay time span(s) of the UE in the corresponding cell(s). The time span is the time of the UE in a connection state, that is, the time starting after a Radio Resource Control (RRC) connection is established. The history information of the UE can be reference of handover decision of the network side.

The cell reselection is that the cells are reselected by a terminal according to relevant parameter information of the cell reselection in a cell broadcast and the measurement of adjacent cells carried out by a terminal. The handover process is that the network side determines a handover policy according to signal qualities of the present cell and adjacent cells reported by the terminal, as well as based on certain handover algorithms, and then informs the terminal to carry out the concrete handover process. However, if the cell reselection parameters are not matched with the relevant handover parameters, the handover may occur subsequent to the establishment of the RRC, which is not necessary and should be avoided.

As for the problem in the related art that it can not be determined whether the cell reselection parameters and the relevant handover parameters are matched, an effective solution is still not proposed yet.

SUMMARY OF THE INVENTION

The present invention is proposed for the problem that the handover may occur immediately after the RRC is established if the cell reselection parameters and the relevant handover parameters are not matched. Hence, the present invention provides a solution for determining the matching of inter-cell reselection parameters and handover parameters, so as to solve at least one of the abovementioned problems.

According to one aspect of the present invention, a method for determining matching of inter-cell reselection parameters and handover parameters is provided, which is used for a handover process of a terminal between cells managed by a source base station and a target opposite end.

The method for determining the matching of the inter-cell reselection parameters and the handover parameters comprises: receiving a handover request message or a relocation request message from the source base station by the target opposite end, wherein the handover request message or the relocation request message carries history information of the terminal, and the history information comprises identifiers (IDs) of cells in which the terminal has stayed and time spans when the terminal stayed in the corresponding cells; counting, by the target opposite end, according to the handover request message or the relocation request message, probability that cell handover of the terminal occurs subsequent to a radio resource control connection is established, wherein if there is only one ID of a cell in the history information, and the time span during which the terminal stayed in the cell is shorter than a preset time span, it is determined that the terminal performs the handover subsequent to the radio resource control connection is established; and if the probability exceeds a threshold, it being determined that the corresponding inter-cell reselection parameters and the handover parameters, which are between the source base station and the target opposite end, are not matched, and if the probability does not exceed the threshold, it being determined that the inter-cell reselection parameters and the handover parameters are matched.

Preferably, under a situation that it is determined that the inter-cell reselection parameters and the handover parameters are not matched, the method also comprises: transmitting a notification message to the source base station or an operation and maintenance system by the target opposite end, wherein the notification message carries indication information for indicating the inter-cell reselection parameters and the handover parameters are not matched.

Preferably, after transmitting the notification message to the source base station or the operation and maintenance system by the target opposite end, the method also comprises: receiving the notification message from the target opposite end and modifying the inter-cell reselection parameters and/ or the handover parameters according to the notification message by the source base station or the operation and maintenance system.

Preferably, the preset time span is set by the source base station according to high-speed attributes of a source cell managed by the source base station.

Preferably, before receiving and counting the handover request message or the relocation request message from the source base station by the target opposite end, the method further comprises: informing the preset time span to the target opposite end by the source base station through one of the following messages: an S1 interface message, an X2 interface message and an inter-system notification message.

Preferably, the target opposite end comprises one of the followings: a target base station, a target radio network controller and a target base station system.

Preferably, under a situation that the target opposite end is the target base station, the step of receiving the handover request message from the source base station by the target opposite end comprises: receiving the handover request message from the source base station by the target base station via a mobile management entity.

Preferably, under a situation that the target opposite end is the target radio network controller, the step of receiving the relocation request message from the source base station by the target opposite end comprises: receiving the handover request message from the source base station and transmitting the relocation request message to the target radio network controller by a core network; and receiving the relocation request message from the core network by the target radio network controller.

Preferably, under a situation that the target opposite end is the target base station system, the step of receiving the handover request message from the source base station by the target opposite end comprises: receiving the handover request message from the source base station by the target base station system via a core network.

According to another aspect of the present invention, an apparatus for determining matching of inter-cell reselection parameters and handover parameter is provided, which is used for a handover process of a terminal between cells managed by a source base station and a target opposite end.

The apparatus for determining the matching of the inter-cell reselection parameters and the handover parameters according to the present invention comprises: a receiving means, configured to receive a handover request message or a relocation request message from the source base station, wherein the handover request message or the relocation request message carries history information of the terminal, and the history information comprises identifiers (IDs) of cells in which the terminal has stayed and time spans when the terminal stayed in the corresponding cells; a counting means, configured to count, according to the handover request message or the relocation request message, probability that cell handover of the terminal occurs subsequent to a radio resource control connection is established, wherein if there is only one ID of a cell in the history information and the time span during which the terminal stayed in the cell is shorter than a preset time span, it is determined that the terminal performs the handover subsequent to the radio resource control connection is established; a judging means, configured to judge whether the probability that the cell handover of the terminal occurs subsequent to a radio resource control connection is established counted by the counting means exceeds a threshold; and a determining means, configured to determine whether the inter-cell reselection parameters and the handover parameters between the source base station and the target opposite end are matched according to the judging result of the judging means.

Preferably, the determining means comprises: a first determining sub-means, configured to determine that the inter-cell reselection parameters and the handover parameters are not matched under a situation that the judging result of the judging means is that the probability exceeds the threshold; and a second determining sub-means, configured to determine that the inter-cell reselection parameters and the handover parameters are matched under a situation that the judging result of the judging means is that the probability does not exceed the threshold.

Preferably, the apparatus also comprises: a transmitting means, configured to transmit a notification message to the source base station or an operation and maintenance system under a situation that the inter-cell reselection parameters and the handover parameters are determined not to be matched by the determining means, wherein the notification message carries indication information used for indicating that the inter-cell reselection parameters and the handover parameters are not matched.

In the present invention, it is judged whether the probability that the terminal performs the handover subsequent to the RRC is established exceeds the threshold, and it is determined, according to the judging results, whether the inter-cell reselection parameters and the handover parameters are matched, which provides powerful basis for the optimization of the parameters related to inter-cell reselection and handover, solves the problem that it can not be determined whether the inter-cell reselection parameters and the handover parameters are matched, thereby laying basis for the improvement of the performance of the network.

THE DRAWINGS OF THE INVENTION

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF EMBODIMENTS

Functional Overview

In consideration of the problem in the related art that under a situation that inter-cell reselection parameters and handover parameters are not matched, a handover may occur immediately after the RRC is established, the embodiments of the invention provide a solution for determining whether inter-cell reselection parameters and handover parameters are matched. For the handover which occurs immediately after the RRC is established, a target opposite end performs determination according to a handover request message or a relocation request message to learn whether the inter-cell reselection parameters and handover parameters are matched according to the determined result. Therefore, parameters, which relate to relevant handover and cell reselection, are optimized based on this basis, and the performance of a network is improved.

It should be noted that embodiments of the present application and the features of the embodiments can be combined with each other if there is no conflict. The present invention will be described in detail with reference to drawings and the embodiments.

Method Embodiment

It should be noted that the steps illustrated in the flowchart of the drawings can be carried out in a computer system such as a group of computer executable instructions. Moreover, although a logic sequence is illustrated in the flowchart, illustrated or described steps can be performed according to a sequence different from what presented herein under some certain situations.

Figure 1:
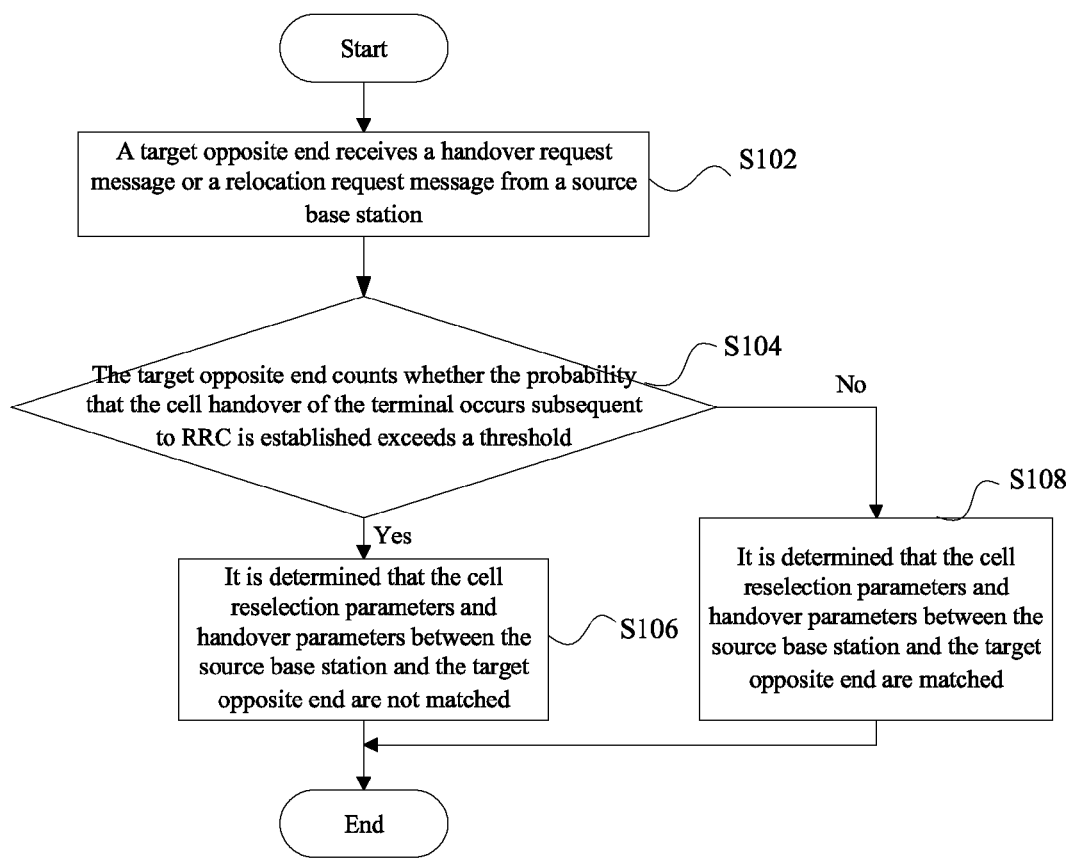
FIG. 1 is a flowchart of a method for determining matching of inter-cell reselection parameters and handover parameters according to the embodiments of the present invention.

According to the embodiments of the present invention, a method for determining the matching of inter-cell reselection parameters and handover parameters is provided. The method is used for a handover process of a terminal between cells managed by a source base station and a target opposite end. FIG. 1 is a flowchart of the method for determining the matching of inter-cell reselection parameters and handover parameters according to the embodiment of the invention. As shown in FIG. 1, the flow comprises the following Step 102 to Step 104.

Step 102, the target opposite end receives a handover request message or a relocation request message from the source base station, wherein the handover request message or the relocation request message carries history information of the terminal, and the history information comprises identifiers (IDs) of cells in which the terminal has stayed and time spans when the terminal stayed in the corresponding cells.

Step 104, the target opposite end counts whether the probability that the cell handover of the terminal occurs subsequent to a radio resource control connection is established exceeds a threshold, wherein if it is determined to be "yes", Step 106 is performed; and if it is determined to be "no", Step 108 is executed.

In the above, if there is only one ID of a cell in the history information and the time span over which the terminal stayed in the cell is shorter than a preset time span, it is determined that the terminal performs the handover subsequent to the radio resource control connection is established. That is to say, under the situation that there is only one cell in the history information of the terminal, it is indicated that the source cell in the handover request message is the first cell where the terminal transfers from an idle state to a connected state; namely, it is the cell where the RRC is established. If the stay time over which the terminal stayed in the cell in the history information is relatively short, it is indicated that the handover request is initiated subsequent to the RRC is established.

Step 106, if the probability that the cell handover is performed subsequent to the RRC is established exceeds the threshold, it is determined that the inter-cell reselection parameters and the handover parameters between the source base station and the target opposite end are not matched.

Step 108, if the probability that the cell handover is performed subsequent to the RRC is established does not exceeds the threshold, it is determined that the inter-cell reselection parameters and the handover parameters between the source base station and the target opposite end are matched.

It can be concluded from the above mentioned Step 102 to Step 108 that, in the LTE system, when a user equipment (UE) performs a handover in cells of the source base station and a target base station, the handover request message contains history information of the terminal; with the time span that the terminal stayed in the cell contained in the history information, the target base station determines whether the cell reselection parameters and the handover parameters are matched; the target base station counts a certain number of handover request messages; and if the probability that the stay time contained in the handover request messages is shorter than a certain threshold is very large, the configuration of the inter-cell reselection parameters between the source cell and the target cell is unreasonable, the cell reselection parameters and the handover parameters are not matched, and a optimization process needs to be performed. Similarly, for a handover between systems, if the time, in the history information contained in the handover request message received by the target side, that the terminal stayed in the cell is too short, a certain number of handover request messages are counted; and if the probability that the stay time of the handover request messages is shorter than a certain threshold is very large, the configuration of the inter-cell reselection parameters between the source cell and the target cell is unreasonable, and the cell reselection parameters and the handover parameters are not matched, wherein the above threshold can be set by the system.

Under the situation that the inter-cell reselection parameters and the handover parameters are not matched, the target opposite end transmits a notification message to the source base station or an Operation And Maintenance system (OAM), wherein the notification message carries indication information used for indicating that the inter-cell reselection parameters and the handover parameters are not matched. The source base station or the OAM system receives the notification message from the target opposite end and modifies the inter-cell reselection parameters and/or the handover parameters according to the notification message. That is to say, the target side notifies the source base station or the OAM system of the situation that the reselection parameters and the corresponding handover parameters of the target cell and the source cell are not matched, so as to further modify relevant parameters to optimize handover performance.

Before the target opposite end receives and counts the handover request messages or the relocation request messages from the source base station, the source base station can inform the preset time span to the target opposite end through an S1 interface message, an X2 interface message or an inter-system notification message, wherein the preset time span is set by the source base station according to the high-speed property of the source cell managed by the source base station.

In the above, the target opposite end can comprise one of the following: the target base station, a target radio network controller and a target base station system. If the target opposite end is the target base station, the target base station receives the handover request messages from the source base station through a Mobile Management Entity (MME). If the target opposite end is the target radio network controller, a Core Network (CN) receives the handover request messages from the source base station and transmits the relocation request message to the target radio network controller; and the target radio network controller receives the relocation request message. If the target opposite end is the target base station system, the target base system receives the handover request messages from the source base station via the CN.

In the present embodiment, it is judged whether the probability that the terminal performs the handover subsequent to the RRC is established exceeds the threshold, and it is determined, according to the judging results, whether the inter-cell reselection parameters and the handover parameters are matched, which provides powerful basis for the optimization of the parameters related to inter-cell reselection and handover, solves the problem that it can not be determined whether the inter-cell reselection parameters and the handover parameters are matched, thereby laying basis for the improvement of the performance of the network.

The realization process of the embodiments of the present invention will be described in detail hereinafter with the combination of embodiments.

Embodiment 1

Figure 2:
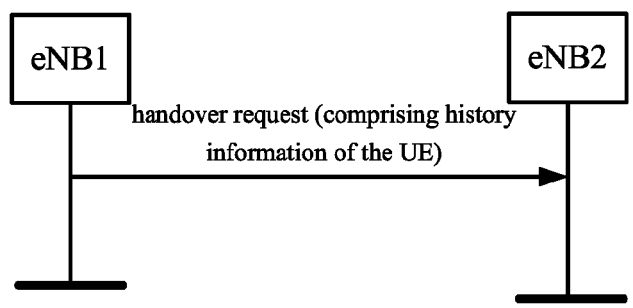
FIG. 2 is a schematic diagram of requesting handover across an X2 interface in an LTE system according to the embodiments of the present invention.

FIG. 2 is a schematic diagram of requesting handover across an X2 interface in an LTE system according to the embodiments of the invention. As shown in FIG. 2, following contents are comprised.

1) A UE is in a connected state in Cell1 managed by eNB1. According to a measurement report of a UE, the eNB1 determines to initiate a handover to a target cell which is Cell2 managed by eNB2. The eNB1 transmits a handover request massage to the eNB2 through the X2 interface, wherein the message comprises history information of the UE, and the history information comprises IDs of cells in which the UE has stayed and time spans the terminal stayed in the corresponding cells.

2) After the eNB2 receives the handover request message transmitted by the eNB1, the eNB2 saves the history information of the UE contained in the handover request message. If there is only one cell in the history information, and the time span over which the UE has stayed in the cell is shorter than a certain preset time span, it can be determined that the UE performs the handover subsequent to the establishment of RRC.

3) The eNB2 counts handover request messages from the Cell1 to the Cell2 in a certain time. If a certain probability that the UE performs handover between the two cells subsequent to the RRC is established occurs, the eNB2 determines that the inter-cell reselection parameters and the corresponding handover parameters between the Cell1 and the Cell2 are not matched. For example, the eNB2 counts that the number of the handover request messages from the Cell1 to the Cell2 within one hour is 10, and the base number of the handover request messages within the preset one hour is 40; thus, the probability of handover between the two cells within this period is 25%. If a threshold is 70%, it is determined that cell reselection parameters and the corresponding handover parameters between the Cell1 and the Cell2 are matched.

4) The eNB2 informs the eNB1 or an OAM system of a situation that the cell reselection parameters and the corresponding handover parameters between the cell1 and the cell2 are not matched, for further modifying relevant parameters for the optimization of handover performance.

In the present embodiment, eNB2 counts the handover request messages from the Cell1 to the Cell2 in the certain time span, and determines whether the inter-cell reselection parameters and the handover parameters are matched, thereby providing a powerful basis of the optimization for the inter-cell reselection parameters and the handover parameters, solving the problem that it can not be determined that whether the inter-cell reselection parameters and the handover parameters are matched, and further laying basis for the improvement of network performance.

Embodiment 2

Figure 3:
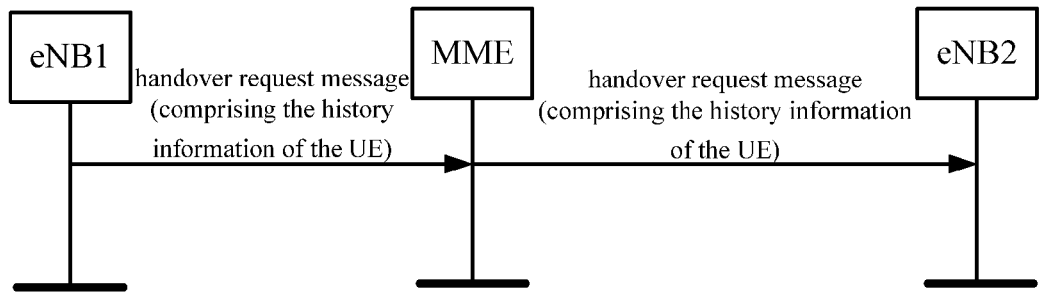
FIG. 3 is a schematic diagram of requesting handover across an S1 interface in an LTE system according to the embodiments of the present invention.

FIG. 3 is a schematic diagram of requesting handover across an S1 interface in an LTE system according to embodiments of the present invention. As shown in FIG. 3, the following contents are comprised.

1) A UE is in a connected state in Cell1 managed by eNB1. According to a report of UE measurement, the eNB1 determines to initiate a handover to a target cell which is Cell2 managed by eNB2. The eNB1 transmits a handover request massage to the eNB2 through the S1 interface. The eNB1 transmits the handover request message to an MME, wherein the message comprises history information of the UE, and the history information comprises IDs of cells in which the UE has stayed and time spans when the terminal stayed in the corresponding cells. The MME transmits the handover request message to the eNB2.

2) After the eNB2 receives the handover request message transmitted by the MME, the eNB2 saves the history information of the UE in the handover request message. If there is only one cell in the history information, and the stay time over which the UE stayed in the cell is shorted than a certain preset time span, it is determined that the UE performs the handover subsequent to RRC is established.

3) The eNB2 counts request messages for handover from the Cell1 to the Cell2 within a certain time span. If a certain probability that the UE performs the handover between the two cells subsequent to the establishment of RRC occurs, the eNB2 determines that the cell reselection parameters and the corresponding handover parameters between the Cell1 and the Cell2 are not matched.

4) The eNB2 notifies the eNB1 or an OAM system of the situation that the cell reselection parameters and the corresponding handover parameters between the Cell1 and the Cell2 are not matched, for further modifying the relevant parameters for the optimization of handover performance.

In the present embodiment, the eNB2 determines whether the inter-cell reselection parameters and handover parameters are matched by counting the request messages for handover from the Cell1 to the Cell2 within the certain time, thereby providing a powerful basis for optimizing inter-cell reselection parameters and handover parameters, solving the problem that it can not be determined whether the inter-cell reselection parameters and the handover parameters are matched, and further laying a basis for the improvement of network performance.

Embodiment 3

Figure 4:
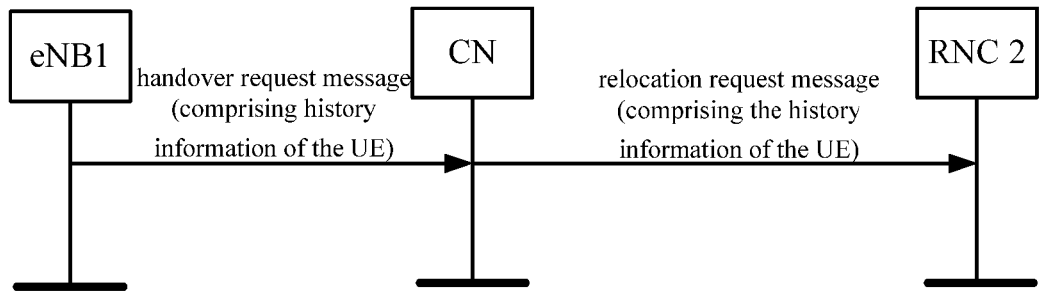
FIG. 4 is a schematic diagram of requesting handover from an LTE system to a UTRAN system according to the embodiments of the present invention.

FIG. 4 is a schematic diagram of requesting a handover from an LTE system to a UTRAN system according to embodiments of the invention. As shown in FIG. 4, the following contents are comprised.

1) A UE is in a connected state in Cell1 managed by eNB1. According to a report of UE measurement, the eNB1 determines to initiate a handover to a target cell which is Cell2 managed by a Radio Network Controller 2 (RNC2). The eNB1 transmits a request message for handover to the RNC2 through an S1 interface, wherein the message comprises history information of the UE, and the history information comprises IDs of cells in which the UE has stayed and time spans when the terminal stayed in the corresponding cells. The eNB1 transmits the handover request message to a CN; and the CN transmits the message to the RNC2.

2) After the RNC2 receives a relocation request message transmitted by the CN, the RNC2 saves the history information of the UE in the handover request message. If there is only one cell in the history information, and the time over which the UE stayed in the cell is shorter than a certain preset time span, it is determined that the UE performs the handover subsequent to the establishment of RRC.

3) The RNC2 counts handover request messages from the Cell1 to the Cell2 within a certain time span. If a certain probability that the UE performs the handover between the two cells subsequent to the establishment of RRC occurs, the RNC2 determines that the cell reselection parameters and the corresponding handover parameters between the Cell1 and the Cell2 are not matched.

4) The RNC2 notifies the eNB1 or an OAM system of the situation that the cell reselection parameters and the corresponding handover parameters between the Cell1 and the Cell2 are not matched, for further modifying the relevant parameters for the optimization of handover performance.

In the present embodiment, the RNC2 determines whether the inter-cell reselection parameters and handover parameters are matched by counting the request messages for handover from the Cell1 to the Cell2 within the certain time span, thereby providing a powerful basis for optimizing inter-cell reselection parameters and handover parameters, solving the problem that it can not be determined whether the inter-cell reselection parameters and the handover parameters are matched, and laying a further basis for the improvement of network performance.

Embodiment 4

1) A UE is in a connected state in Cell1 managed by eNB1. According to a report of UE measurement, the eNB1 determines to initiate a handover to a target cell which is Cell2 managed by a Base Station System 2 (BSS2). The eNB1 transmits a request message for handover to the BBS2 through an S1 interface. The eNB1 transmits the handover request message to a CN. The CN transmits the message to the BSS2. The message comprises history information of the UE, wherein the history information comprises IDs of cells in which the UE has stayed and time spans when the terminal stayed in the corresponding cells.

2) After the BSS2 receives the handover request message transmitted by the CN, the BSS2 saves the history information of the UE in the handover request message. If there is only one cell in the history information, and the time over which the UE stayed in the cell is shorter than a certain preset time span, it is determined that the UE performs the handover subsequent to the establishment of RRC.

3) The BSS2 counts handover request messages from the Cell1 to the Cell2 within a certain time. If a certain probability that the UE performs the handover between the two cells subsequent to the establishment of RRC occurs, the BBS2 determines that the cell reselection parameters and the corresponding handover parameters between the Cell1 and the Cell2 are not matched.

4) The BSS2 notifies the eNB1 or an OAM system of the situation that the cell reselection parameters and the corresponding handover parameters between the Cell1 and the Cell2 are not matched, for further modifying the relevant parameters for the optimization of handover performance.

In the present embodiment, the BSS2 determines whether the inter-cell reselection parameters and handover parameters are matched by counting the request messages for handover from the Cell1 to the Cell2 within the certain time, thereby providing a powerful basis for optimizing inter-cell reselection parameters and handover parameters, solving the problem that it can not be determined whether the inter-cell reselection parameters and the handover parameters are matched, and further laying a basis for the improvement of network performance.

It should be noted that the preset time span in the above-mentioned embodiments can be set according to the high-speed performance of the Cell1 and is informed to the eNB2 through an S1 message or an X2 interface message, or be informed to the RNC2 or the BSS2 through an inter-system message.

The abovementioned embodiments can determine accurately whether the inter-cell reselection parameters and the handover parameters are matched, which is a basis for the optimization of specific parameters, and can reduce unnecessary handovers, thus improving the performance of the network and realizing self-optimization function of the network.

Device Embodiments

Figure 6:
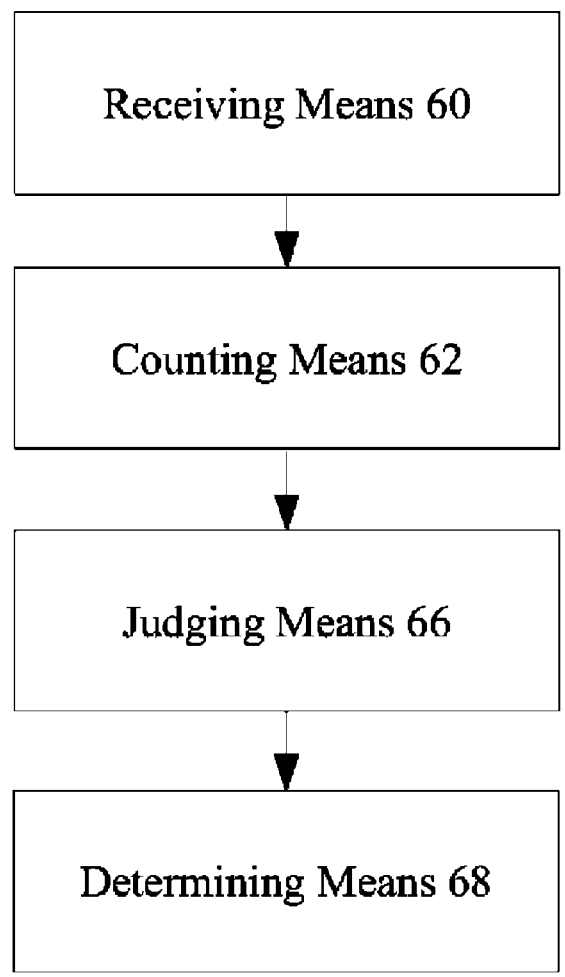
FIG. 6 is a structure diagram of an apparatus for determining the matching of inter-cell reselection parameters and handover parameters according to the embodiments of the present invention.

According to the embodiments of the invention, an apparatus for judging the matching of inter-cell reselection parameters and handover parameters is provided. FIG. 6 is a structure diagram of an apparatus for judging whether the inter-cell reselection parameters and the handover parameters are matched according to embodiments of the present invention. As shown in FIG. 6, the apparatus comprises a receiving means 60, a counting means 62, a judging means 66 and a determining means 68. The structure will be described hereinafter.

The receiving means 60 is configured to receive a handover request message or a relocation request message from the source base station, wherein the handover request message or the relocation request message carries history information of the terminal, and the history information comprises identifiers (IDs) of cells in which the terminal has stayed and time spans when the terminal stayed in the corresponding cells; and the counting means 62, coupled to the receiving means 60, is configured to count, according to the handover request message or the relocation request message, the probability that cell handover of the terminal occurs subsequent to a radio resource control connection is established, wherein if there is only one ID of a cell in the history information and the time over which the terminal stayed in the cell is shorter than a preset time span, it is determined that the terminal performs the handover subsequent to the radio resource control connection is established.

The judging means 66, coupled to the counting means 62, is configured to judge whether the probability that the cell handover of the terminal occurs subsequent to a radio resource control connection is established counted by the counting means 62 exceeds a threshold; and the determining means 68, coupled to the judging means 66, is configured to determine whether the inter-cell reselection parameters and the handover parameters between the source base station and the target opposite end are matched according to the judging result of the judging means 66.

In the apparatus of the present embodiment, the judging means 66 judges whether the probability that the terminal performs handover subsequent to the RRC is established exceeds the threshold, and the determining means 68 further determines whether the inter-cell reselection parameters and the handover parameters are matched, thereby providing a powerful basis for the optimization of inter-cell reselection parameters and handover parameters, solving the problem that it can not be determined whether the inter-cell reselection parameters and the handover parameters are matched, and further laying a basis for the improvement of the performance of the network.

Figure 7:
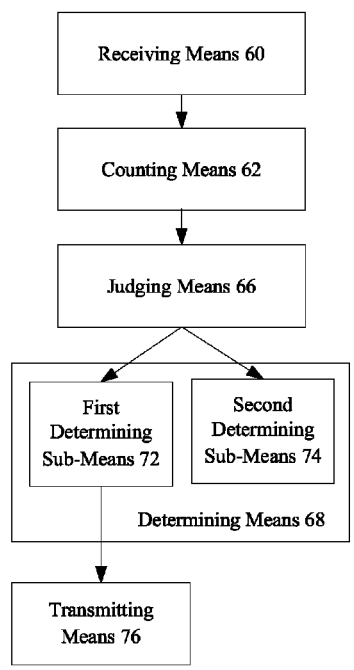
FIG. 7 is a concrete structural diagram of the apparatus for determining the matching of inter-cell reselection parameters and handover parameters according to the embodiments of the present invention.

FIG. 7 is a concrete structural diagram of the apparatus for judging whether cell reselection parameter and handover parameter are matched according to embodiments of the present invention. As shown in FIG. 7, the above mentioned determining means 68 comprises a first determining sub-means 72 and a second determining sub-means 74.

The first determining sub-means 72, coupled to the judging means 66, is configured to determine that the inter-cell reselection parameters and the handover parameters are not matched under a situation that the judging result of the judging means 66 is that the probability exceeds the threshold; and the second determining sub-means 74, coupled to the judging means 66, is configured to determine that the inter-cell reselection parameters and the handover parameters are matched under a situation that he judging result of the judging means 66 is that the probability does not exceed the threshold.

As shown in FIG. 7, the above mentioned apparatus also comprises a transmitting means 76.

The transmitting means 76, coupled to a first determining sub-means 72 in the determining means 68, is configured to transmit a notification message to the source base station or an OAM system under a situation that the inter-cell reselection parameters and the handover parameters are determined not to be matched by the determining means 68, wherein the notification message carries indication information used for indicating that the inter-cell reselection parameters and the handover parameters are not matched.

The source base station or the OAM system receives the notification message from the target opposite end and modifies the inter-cell reselection parameters and/or handover parameters according to the notification message.

To sum up, according to the above mentioned embodiments of the present invention, it can be accurately determined whether the inter-cell reselection parameters and the handover parameters are matched, and on this basis, specific parameters can be optimized, self-optimization function of network can be realized, and the performance of the network can be improved.

Obviously, those skilled in the art shall understand that individual means and individual steps of the present invention can be implemented with general computing devices, they may be integrated in a single computing device or distributed in network formed by a plurality of computing devices, optionally, they may be implemented by using program codes executable by computing devices, thus they may be stored in memory devices for execution by the computing devices, or implemented by making them into integrated circuit means respectively, or by making several means or steps in to a single IC. Thus, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for judging matching of inter-cell reselection parameters and handover parameters, which is used for a handover process of a terminal between cells managed by a source base station and a target opposite end, the method comprising:

receiving a handover request message or a relocation request message from the source base station by the target opposite end, wherein the handover request message or the relocation request message carries history information of the terminal, and the history information comprises identifiers (IDs) of cells in which the terminal has stayed and time spans when the terminal stayed in the corresponding cells;

counting, by the target opposite end, according to the handover request message or the relocation request message, probability that cell handover of the terminal occurs subsequent to a radio resource control connection is established, wherein if there is only one ID of a cell in the history information, and the time span during which the terminal stayed in the cell is shorter than a preset time span, it is determined that the terminal performs the handover subsequent to the radio resource control connection is established; and if the probability exceeds a threshold, it being determined that the corresponding inter-cell reselection parameters and the handover parameters, which are between the source base station and the target opposite end, are not matched, and if the probability does not exceed the threshold, it being determined that the inter-cell reselection parameters and the handover parameters are matched.

2. The method according to claim 1, wherein, under a situation that it is determined that the inter-cell reselection parameters and the handover parameters are not matched, the method further comprises:

transmitting a notification message to the source base station or an operation and maintenance system by the target opposite end, wherein the notification message carries indication information for indicating the inter-cell reselection parameters and the handover parameters are not matched.

3. The method according to claim 2, wherein, after transmitting the notification message to the source base station or the operation and maintenance system by the target opposite end, the method further comprises:

receiving the notification message from the target opposite end and modifying the inter-cell reselection parameters and/or the handover parameters according to the notification message by the source base station or the operation and maintenance system.

4. The method according to claim 1, wherein the preset time span is set by the source base station according to high-speed attributes of a source cell managed by the source base station.

5. The method according to claim 1, wherein, before receiving the handover request message or the relocation request message from the source base station by the target opposite end, the method further comprises:

informing the preset time span to the target opposite end by the source base station through one of the following messages:

an S1 interface message, an X2 interface message and an inter-system notification message.

6. The method according to claim 1, wherein the target opposite end comprises one of the followings:
a target base station, a target radio network controller and a target base station system.

7. The method according to claim 6, wherein, under a situation that the target opposite end is the target base station, the step of receiving the handover request message from the source base station by the target opposite end comprises:
receiving the handover request message from the source base station by the target base station via a mobile management entity.

8. The method according to claim 6, wherein under a situation that the target opposite end is the target radio network controller, the step of receiving the relocation request message from the source base station by the target opposite end comprises:
receiving the handover request message from the source base station and transmitting the relocation request message to the target radio network controller by a core network; and
receiving the relocation request message from the core network by the target radio network controller.

9. The method according to claim 6, wherein under a situation that the target opposite end is the target base station system, the step of receiving the handover request message from the source base station by the target opposite end comprises:
receiving the handover request message from the source base station by the target base station system via a core network.

10. An apparatus for determining matching of inter-cell reselection parameters and handover parameters, which is used for a handover process of a terminal between cells managed by a source base station and a target opposite end, comprising:
a receiving means, configured to receive a handover request message or a relocation request message from the source base station, wherein the handover request message or the relocation request message carries history information of the terminal, and the history information comprises identifiers (IDs) of cells in which the terminal has stayed and time spans when the terminal stayed in the corresponding cells;
a counting means, configured to count, according to the handover request message or the relocation request message, probability that cell handover of the terminal occurs subsequent to a radio resource control connection is established, wherein if there is only one ID of a cell in the history information and the time span during which the terminal stayed in the cell is shorter than a preset time span, it is determined that the terminal performs the handover subsequent to the radio resource control connection is established;
a judging means, configured to judge whether the probability that the cell handover of the terminal occurs subsequent to a radio resource control connection is established counted by the counting means exceeds a threshold; and
a determining means, configured to determine whether the inter-cell reselection parameters and the handover parameters between the source base station and the target opposite end are matched according to the judging result of the judging means.

11. The apparatus according to claim 10, wherein the determining means comprises:
a first determining sub-means, configured to determine that the inter-cell reselection parameters and the handover parameters are not matched under a situation that the judging result of the judging means is that the probability exceeds the threshold; and
a second determining sub-means, configured to determine that the inter-cell reselection parameters and the handover parameters are matched under a situation that the judging result of the judging means is that the probability does not exceed the threshold.

12. The apparatus according to claim 10, wherein the apparatus further comprises:
a transmitting means, configured to transmit a notification message to the source base station or an operation and maintenance system under a situation that the inter-cell reselection parameters and the handover parameters are determined not to be matched by the determining means, wherein the notification message carries indication information used for indicating that the inter-cell reselection parameters and the handover parameters are not matched.

* * * * *

UNITED STATES PATENT AND TRADEMARK OFFICE
CERTIFICATE OF CORRECTION

PATENT NO. : 8,817,752 B2  Page 1 of 1
APPLICATION NO. : 13/266109
DATED : August 26, 2014
INVENTOR(S) : Han et al.

It is certified that error appears in the above-identified patent and that said Letters Patent is hereby corrected as shown below:

On the title page item [74], Change "Knobbe, Martens, Olsen & Bear, LLP" to --Knobbe, Martens, Olson & Bear, LLP--.

On the title page item [57], line 2, Change "apparatus" to --apparatuses--.

On the title page item [56], column 1 (page 2) line 6, Under Other Publications, Change "Rubustness" to --Robustness--.

Figure 5:
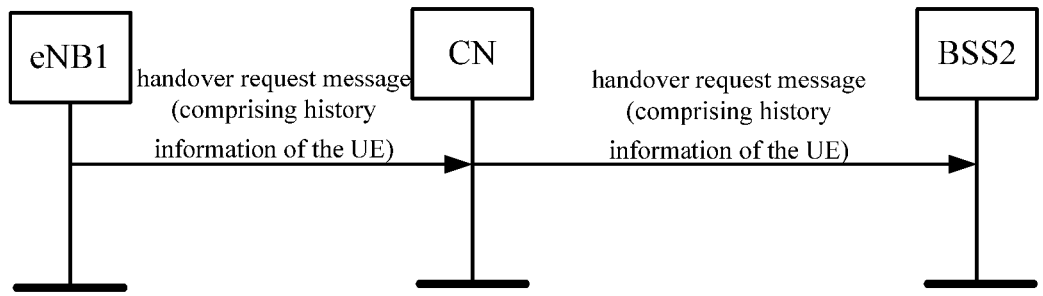
FIG. 5 is a schematic diagram of requesting handover from an LTE system to a GSM system according to the embodiments of the present invention.

Column 9 at line 45, After "Embodiment 4" insert --Fig. 5 is a schematic diagram of requesting handover from an LTE system to a GSM system 25 according to embodiments of the invention. As shown in Fig. 5, the following contents are comprised.--.

Signed and Sealed this
Twentieth Day of October, 2015

Michelle K. Lee
*Director of the United States Patent and Trademark Office*